US012729755B2

(12) United States Patent
Kim et al.

(10) Patent No.: US 12,729,755 B2
(45) Date of Patent: Sep. 8, 2026

(54) PINION GEAR UNIT AND SWIVEL ACTUATOR USING SAME

(71) Applicant: AMOTECH CO., LTD, Incheon (KR)

(72) Inventors: Byung Soo Kim, Incheon (KR); Jong Hwa Shin, Incheon (KR)

(73) Assignee: AMOTECH CO., LTD, Incheon (KR)

( * ) Notice: Subject to any disclaimer, the term of this patent is extended or adjusted under 35 U.S.C. 154(b) by 0 days.

(21) Appl. No.: 19/104,702

(22) PCT Filed: Aug. 22, 2023

(86) PCT No.: PCT/KR2023/012402
§ 371 (c)(1),
(2) Date: Feb. 18, 2025

(87) PCT Pub. No.: WO2024/049083
PCT Pub. Date: Mar. 7, 2024

(65) Prior Publication Data

US 2026/0055802 A1 Feb. 26, 2026

(30) Foreign Application Priority Data

Aug. 29, 2022 (KR) ........................ 10-2022-0108242

(51) Int. Cl.
*F16H 37/04* (2006.01)
*B60N 2/14* (2006.01)
(Continued)

(52) U.S. Cl.
CPC ............. *F16H 37/041* (2013.01); *B60N 2/14* (2013.01); *F16H 57/021* (2013.01);
(Continued)

(58) Field of Classification Search
CPC .... F16H 37/041; F16H 57/021; F16H 57/023; F16H 57/039; F16H 2057/0213;
(Continued)

(56) References Cited

U.S. PATENT DOCUMENTS 6,158,811 A 12/2000 Hofschulte et al.
2004/0216545 A1* 11/2004 Brill .......................... F16D 3/04 74/333
2010/0291830 A1* 11/2010 Doherty ................. A63H 31/08 446/457

FOREIGN PATENT DOCUMENTS

KR 20200036172 A 4/2020
KR 102249439 B1 6/2021
(Continued)

OTHER PUBLICATIONS

English Translation of WO-2022139509-A1 (Year: 2022).*
International Search Report—PCT/KR2023/012402 dated Dec. 6, 2023.

*Primary Examiner* — Victor L Macarthur
(74) *Attorney, Agent, or Firm* — CANTOR COLBURN LLP

(57) ABSTRACT

Provided are a pinion gear unit and a swivel actuator using same, wherein the pinion gear unit is capable of maximizing a torsional force of a pinion gear and a worm wheel connected to a ring gear. The swivel actuator may include: a lower housing having a hollow cylindrical portion protruding upward from the center thereof, the hollow cylindrical portion serving as a support shaft of a rotor; an upper housing assembled to an upper portion of the lower housing and having a hollow cylindrical portion protruding upward from a central portion thereof; a driving motor having a rotor worm gear formed on an outer circumference of a cylindrical extension portion extending upward from the rotor inside the lower housing; first and second gear trains respectively coupled to the outer circumference of the rotor worm gear inside the upper housing, having first and second worm wheels coupled to the rotor worm gear in the middle of the first and second power transmission shafts, and having first to fourth worm gears formed on both sides thereof; first to
(Continued)

fourth pinion gear units having third to sixth worm wheels and first to fourth pinion gears gear-coupled to the first to fourth worm gears, respectively; and a rotary table having a ring gear to which the first to fourth pinion gears are coupled and rotated.

9 Claims, 12 Drawing Sheets

(51) Int. Cl.

| | |
|---|---|
| ***F16H 57/021*** | (2012.01) |
| ***F16H 57/023*** | (2012.01) |
| ***F16H 57/039*** | (2012.01) |
| *B60N 2/02* | (2006.01) |
| *H02K 11/215* | (2016.01) |

(52) U.S. Cl.
CPC ......... *F16H 57/023* (2013.01); *F16H 57/039* (2013.01); *B60N 2002/022* (2013.01); *F16H 2057/0213* (2013.01); *H02K 11/215* (2016.01)

(58) Field of Classification Search
CPC ..... F16H 1/225; B60N 2/14; B60N 2002/022; B60N 2/02246; B60N 2/02253; H02K 11/215; H02K 7/08; H02K 7/116; H02K 11/30; H02K 7/083
See application file for complete search history.

(56) References Cited

FOREIGN PATENT DOCUMENTS

| | | | | |
|---|---|---|---|---|
| KR | 20220056821 A | | 5/2022 | |
| KR | 20220092407 A | | 7/2022 | |
| WO | WO-2022139509 A1 | * | 6/2022 | ............. H02K 7/116 |

* cited by examiner

【FIG. 1】
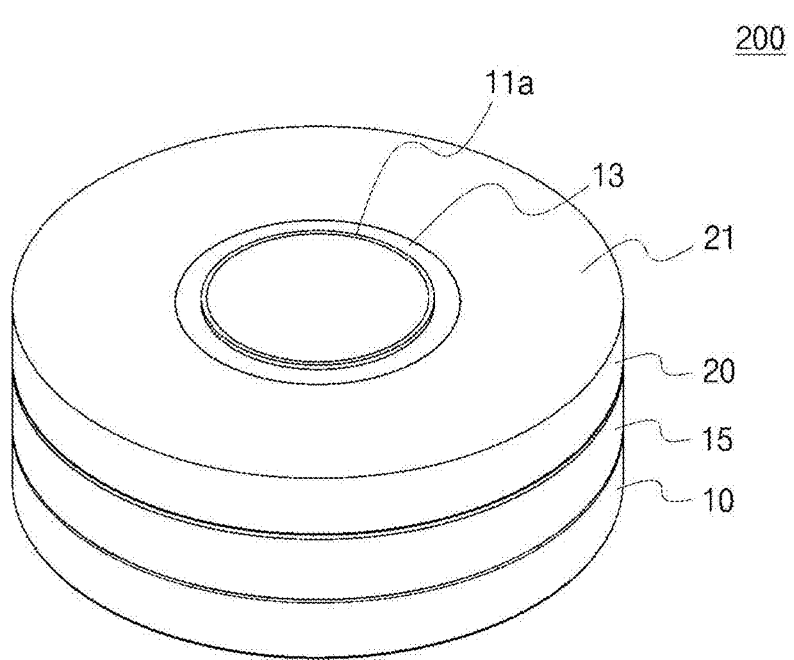

【FIG. 2】
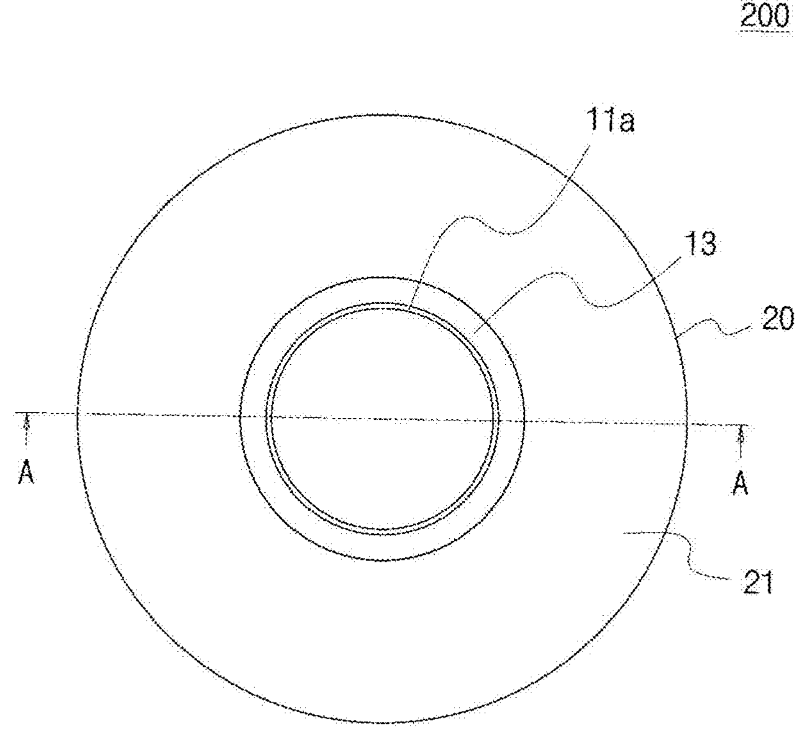
【FIG. 3】
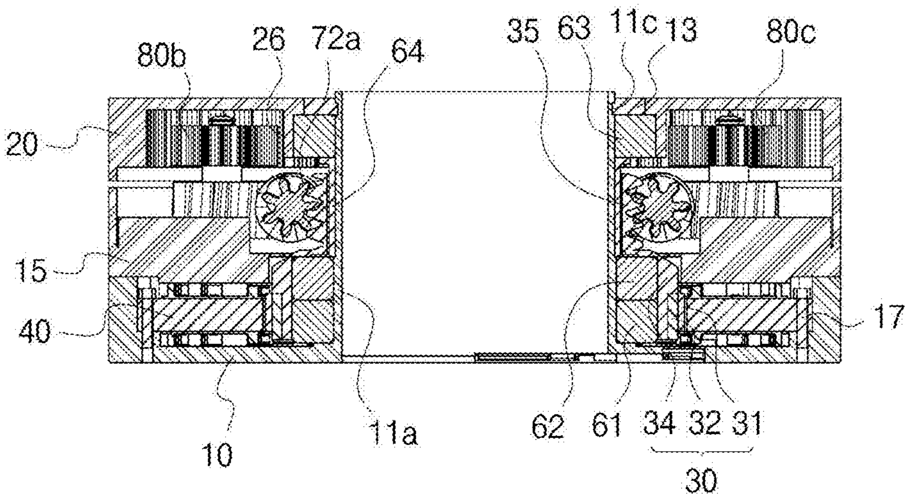

【FIG. 4】
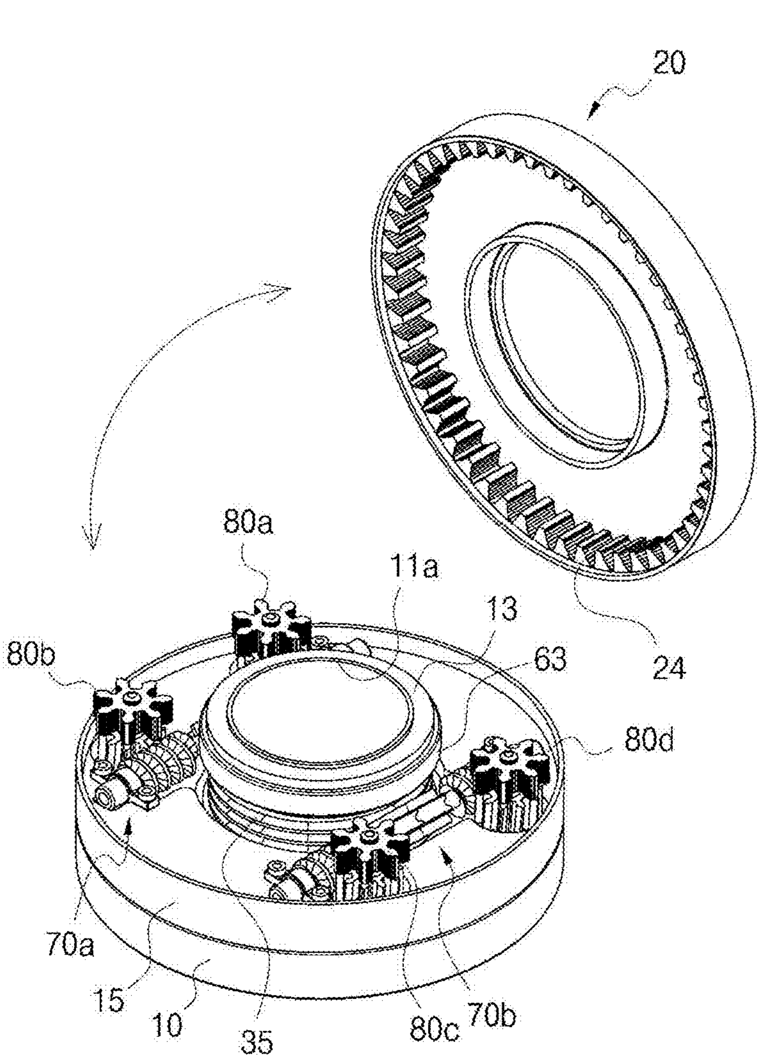

【FIG. 5】
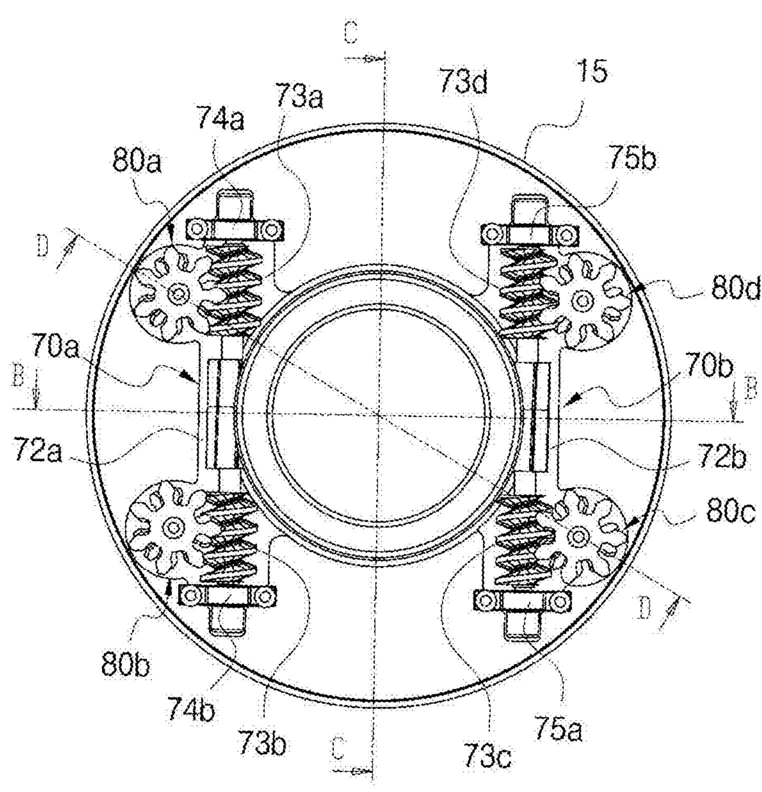
【FIG. 6A】
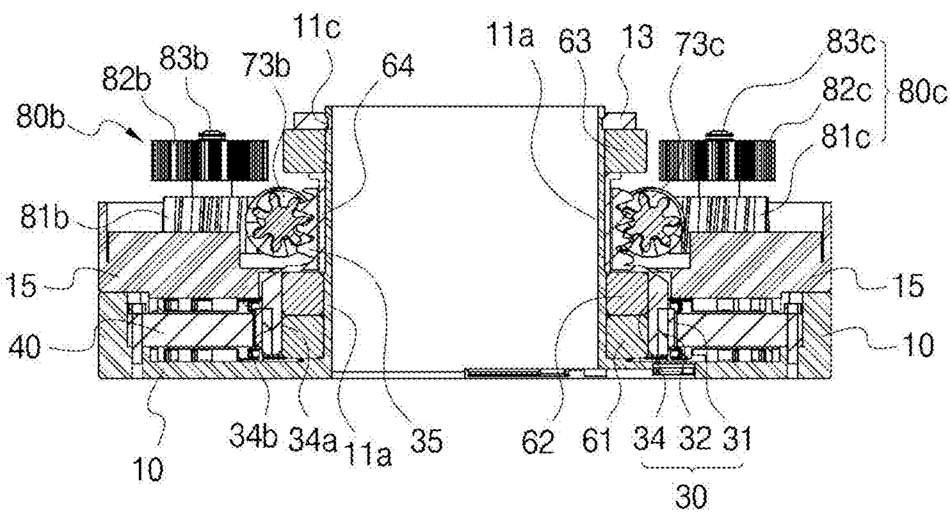

【FIG. 6B】
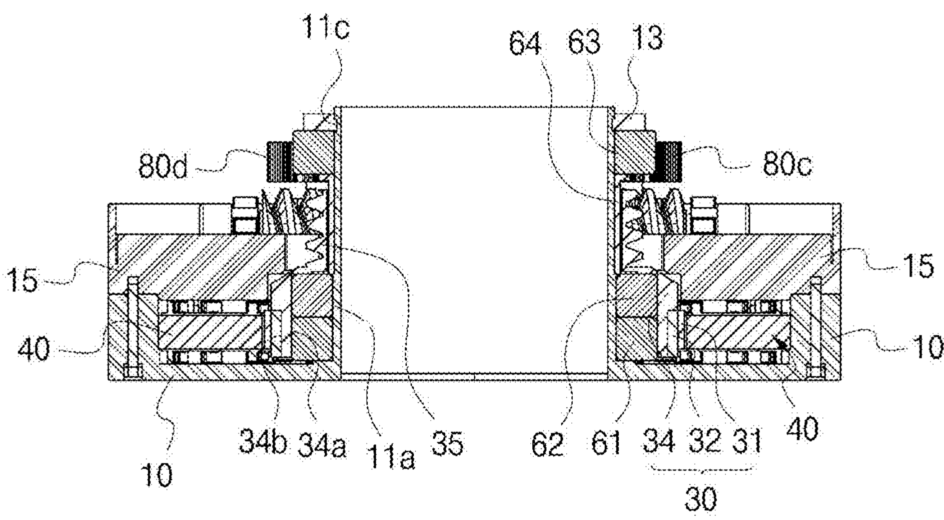
【FIG. 6C】
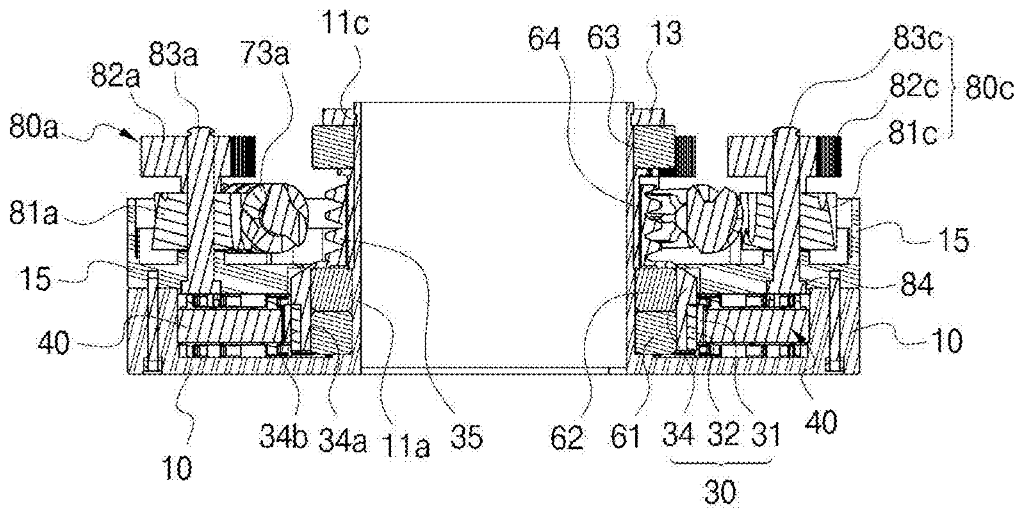

【FIG. 7】
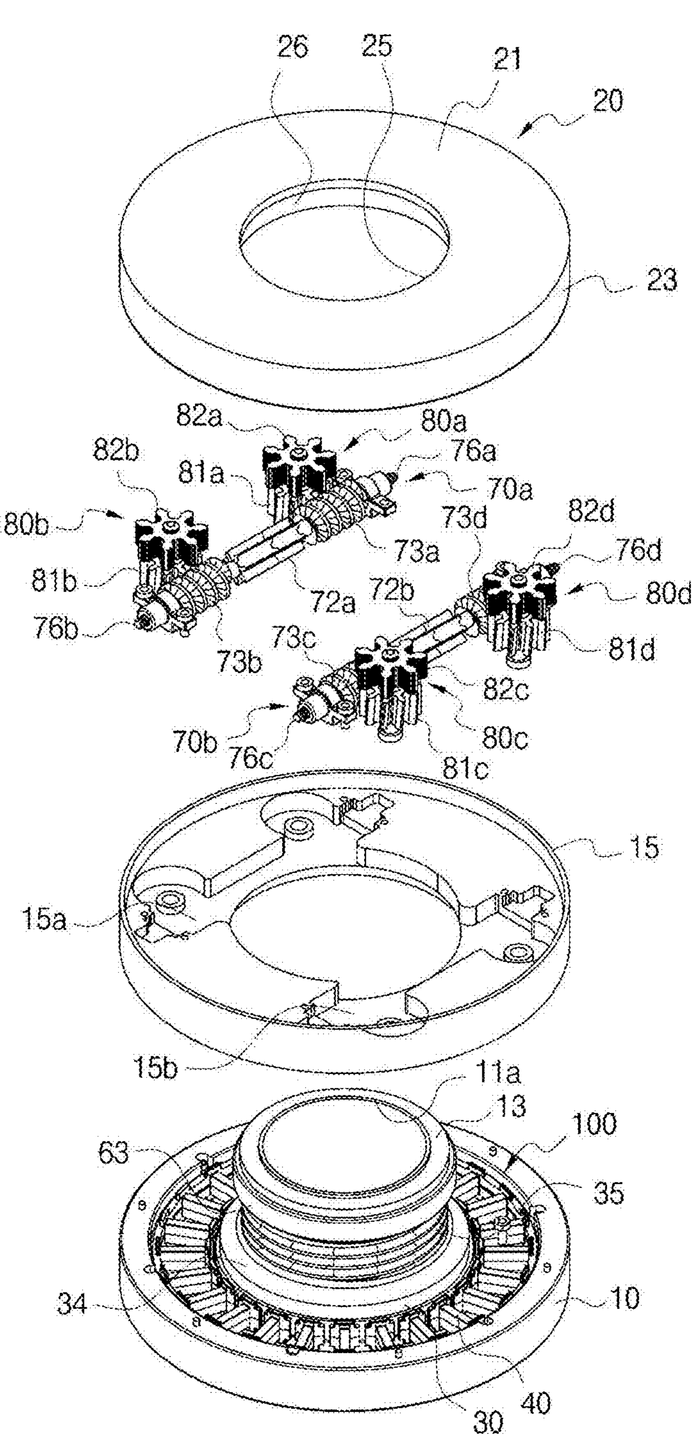

【FIG. 8】
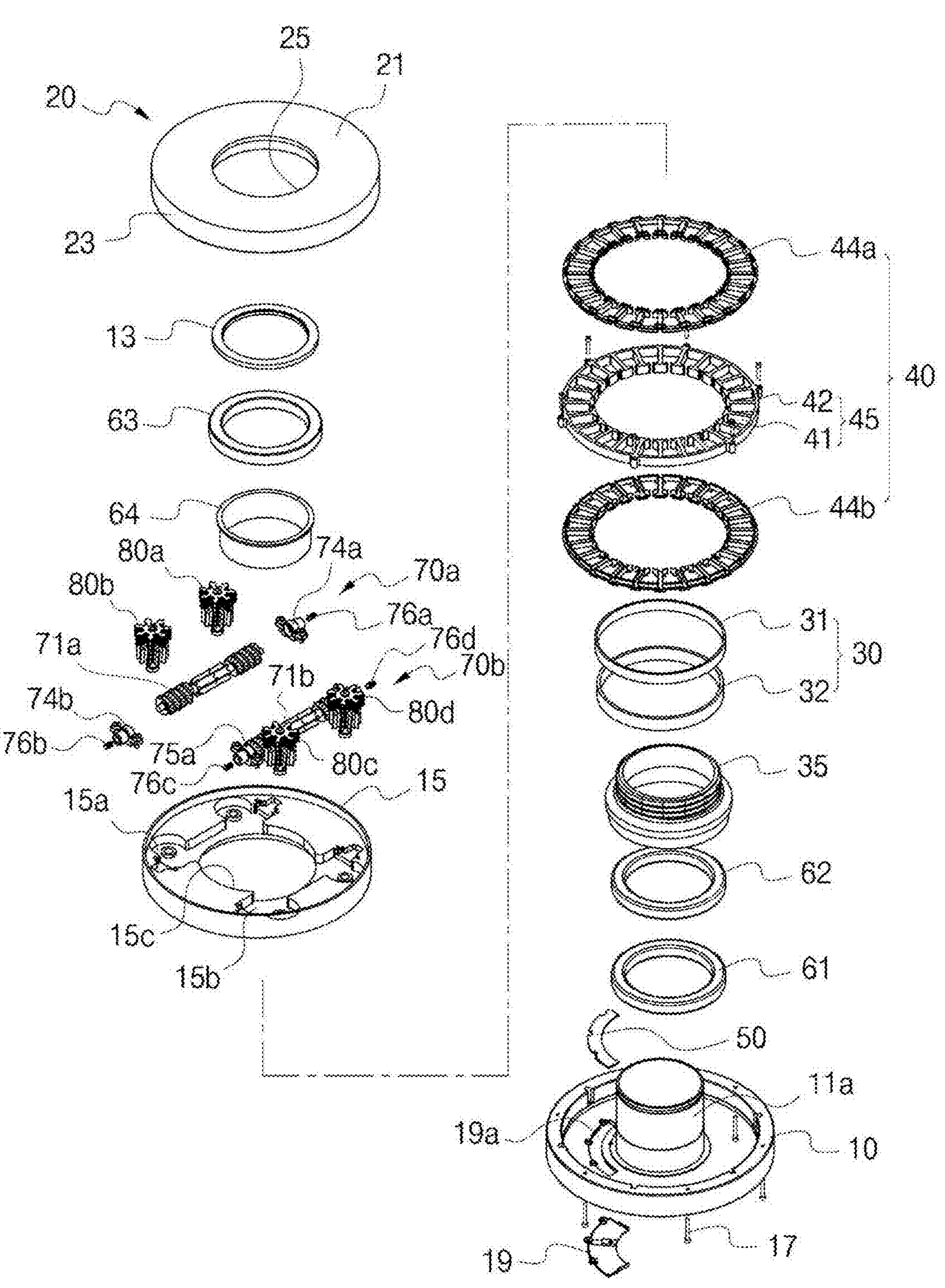

【FIG. 9】
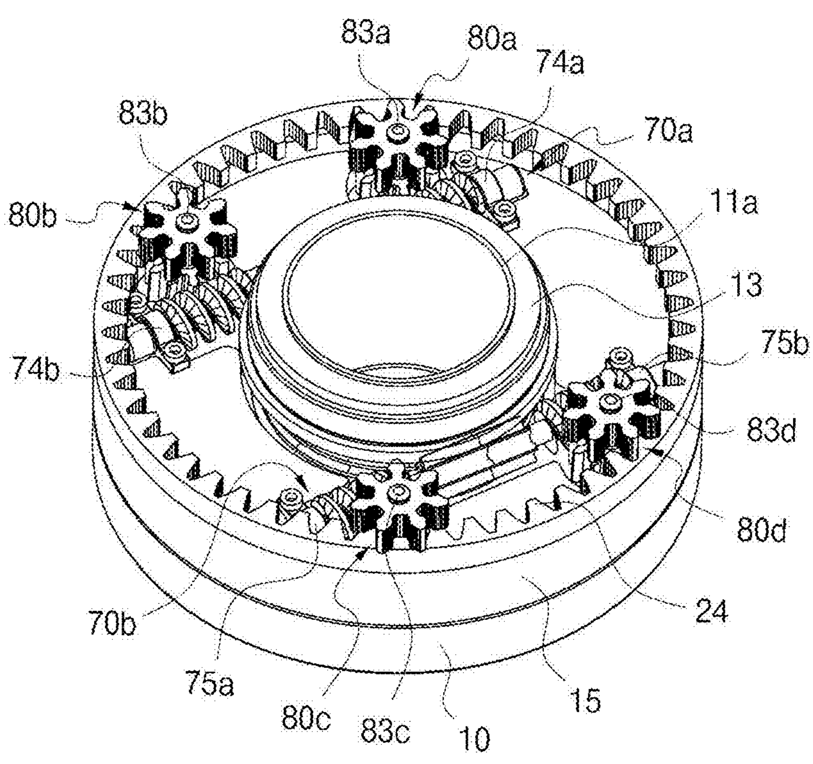

【FIG. 10A】
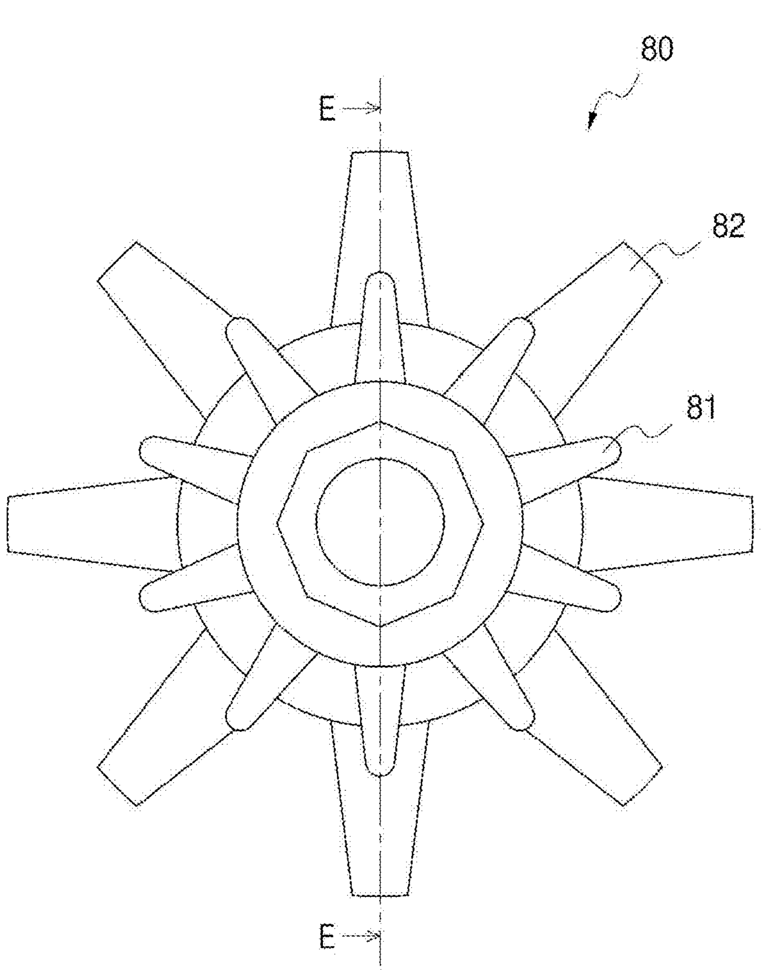

【FIG. 10B】
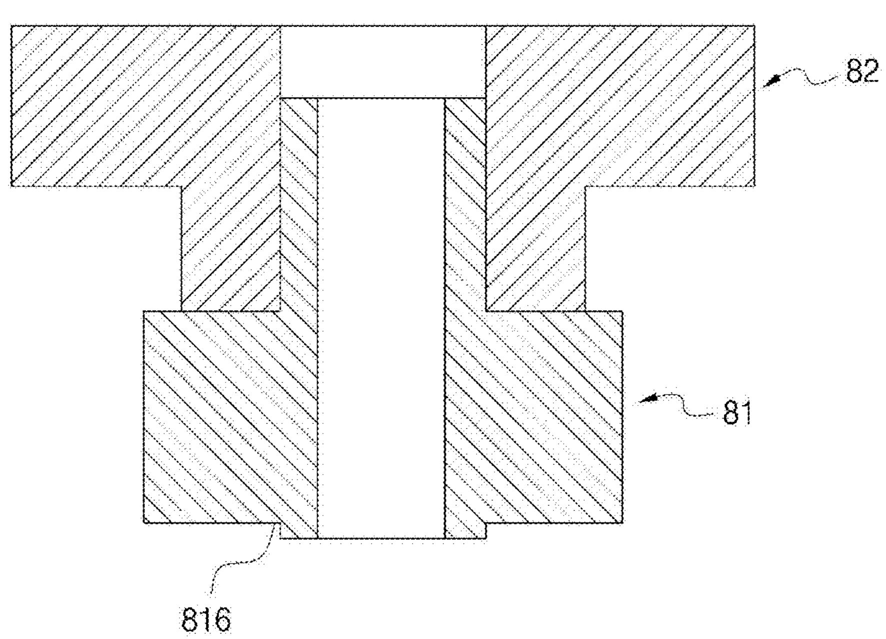

【FIG. 10C】
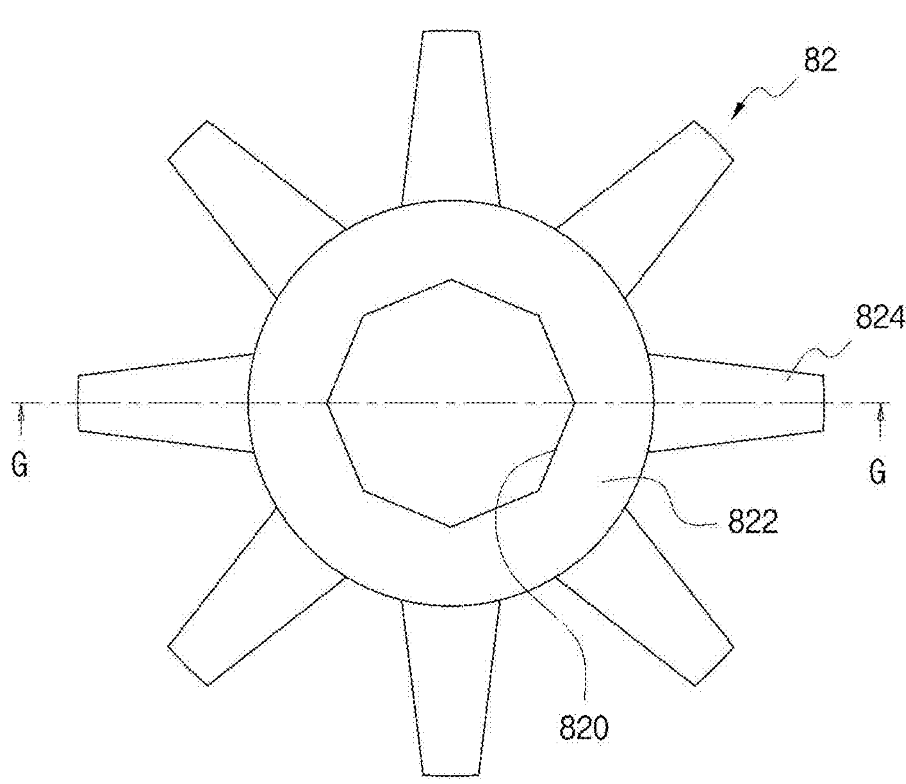
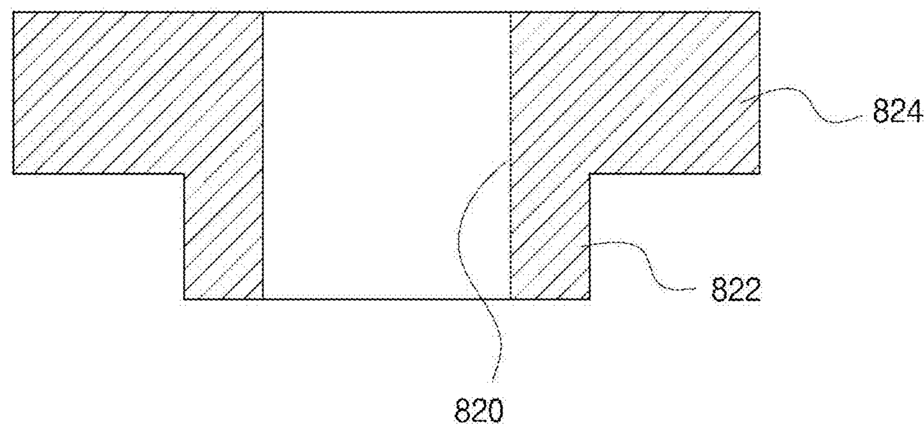

【FIG. 10D】
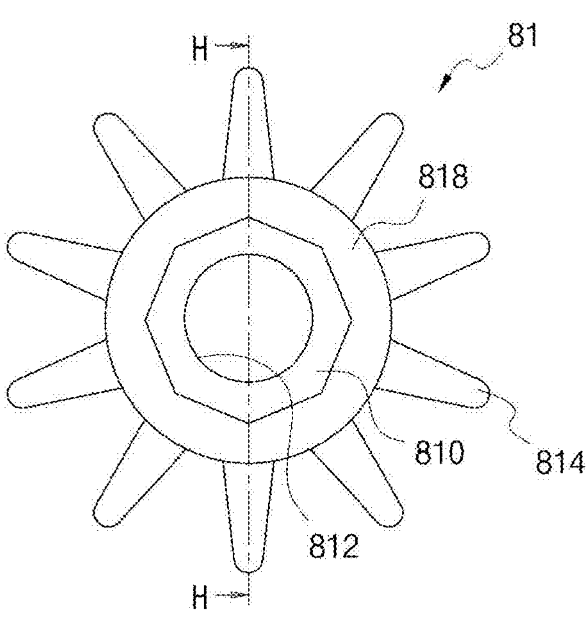
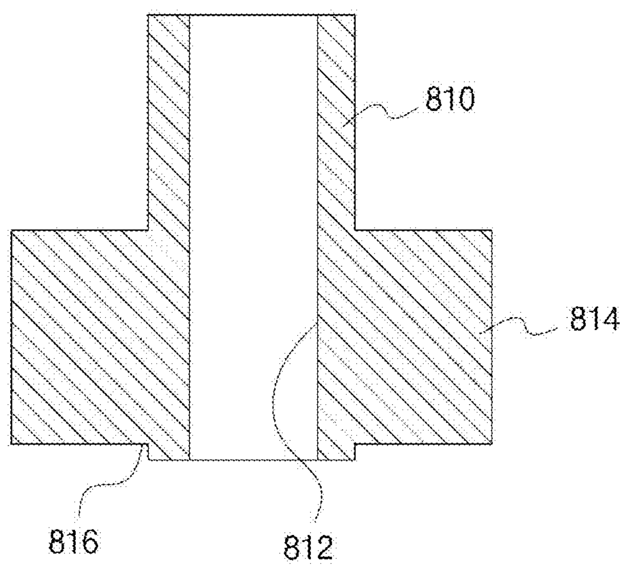

PINION GEAR UNIT AND SWIVEL ACTUATOR USING SAME

TECHNICAL FIELD

The present invention relates to a swivel actuator, and more particularly, to a pinion gear unit and a swivel actuator using same, in which a pinion gear and a worm wheel are sintered and formed, and then a polygonal coupling portion of the worm wheel is inserted into a polygonal inner circumferential portion of the pinion gear to form the pinion gear unit, thereby maximizing the torsional force between the pinion gear and the worm wheel connected to a ring gear.

BACKGROUND ART

An electric actuator rotates or linearly moves a passive object to be driven with a high torque rotational force obtained by torque conversion of the rotational force generated from a rotating power source.

In general, the actuator has a low height of the housing as a whole product in use, and one of the horizontal and the vertical is configured to have a long shape. Accordingly, it is difficult to employ a structure in which a direct-current (DC) motor having an outer casing is vertically mounted on the inner bottom of the housing.

In the case of using a DC motor, the brake torque should be increased by using a worm gear because a stationary position should be kept when external pressure is applied on the output shaft that rotates forward and reverse.

To use a worm gear and a worm wheel in a DC motor and to deliver power to the position where the output shaft is located, the connection therebetween is usually formed using a spur gear, in which case the following problems exist.

First, since the housing height of the actuator is low, there is a problem in that a DC motor is generally laid and applied, and thus an assembly structure is difficult and a unit cost is increased. That is, there is a problem in securing an assembly space due to the casing of the DC motor and the bearing that needs to hold the worm shaft.

Second, the structure of connecting the motor power to a motor controller becomes complicated.

Third, rotational position information of the rotor is required for accurate position control in the actuator. To this end, since a rotational position sensing magnet is arranged at the bottom of a warm gear of a DC motor and a rotational position sensing Hall sensor integrated circuit (IC) is applied, the structure of connecting a Hall sensor to a PCB is complicated to use DC power and to sense the rotational position.

Fourth, in a gear train that uses multiple spur gears to obtain a large reduction ratio, the tolerance the rotating power of the driving motor increases, resulting in a large backlash and difficulty in controlling the precise position.

Meanwhile, in recent years, a swivel actuator has been used to rotate a main body of a driven object (i.e., a car seat) from side to side along with a rotary table as an actuator for rotating a vehicle car seat from side to side.

Considering that conventional actuators use direct-current (DC) motors lying inside low-height housing, a swivel actuator with a compact and slim structure, by installing a core motor-type brushless direct-current (BLDC) motor vertically on the bottom of the housing and installing a reduction gear train on the top thereof is proposed in Korean Patent Application Publication No. 10-2022-0056821 (Patent Document 1).

The swivel actuator of Patent Document 1 also proposes a structure of rotating a rotary table by a power transmission structure capable of minimizing backlash, by a gear train change structure of minimizing the number of coupling gears, by integrally forming a worm wheel and a worm gear at intervals on a power transmission shaft.

However, since the swivel actuator of Patent Document 1 is a structure that transmits rotational power using one gear train between the BLDC motor and the pinion gear unit driving the rotary table, the tolerance between gears may be reduced, but not completely reduced, and the brake torque that controls the left and right rotation of the driven object main body (i.e., car seat) that rotates with the rotary table is low, making it impossible to suppress vibration generation.

DISCLOSURE

Technical Problem

The present invention has been made in view of the above problems, and it is an objective of the present invention to provide a swivel actuator capable of minimizing backlash and simultaneously suppressing generation of vibration of a rotary table, by forming four worm gears on both end portions of a pair of power transmission shafts and transmitting the rotational force decelerated using four pinion gear units at four points to the ring gear of the rotary table.

It is another objective of the present invention to provide a swivel actuator that can increase the fracture strength by increasing the brake torque while minimizing the backlash by employing a double worm structure at both end portions of a first gear train and a second gear train, thereby coupling four pinion gear units to four worm gears and thus driving a rotary table.

It is another objective of the present invention to provide a swivel actuator capable of removing tolerance generated when coupling between gears and enabling a backlash to be zero by suppressing left and right displacements in a bearing housing by using a set screw on both end portions of a power transmission shaft of first and second gear trains.

It is another objective of the present invention to provide a pinion gear unit and a swivel actuator using same, in which a pinion gear and a worm wheel are sintered and formed, and then a polygonal coupling portion of the worm wheel is inserted into a polygonal inner circumferential portion of the pinion gear to form the pinion gear unit, thereby maximizing the torsional force between the pinion gear and the worm wheel connected to a ring gear.

Technical Solution

According to an aspect of the present invention, there is provided a pinion gear unit including: a support shaft having a lower end portion supported on a housing; a worm wheel having an outer circumferential portion gear-coupled to the worm gear and a central portion rotatably coupled to the support shaft and having a polygonal coupling portion formed at an upper end extension portion; and a pinion gear having a polygonal inner circumferential portion to which the polygonal coupling portion is coupled to the central portion, and having an outer circumferential portion gear-coupled to a ring gear.

The worm wheel and the pinion gear may be separately sintered and formed, and then the polygonal coupling portion of the worm wheel may be coupled to the polygonal inner circumferential portion of the pinion gear.

According to another aspect of the present invention, there is provided a swivel actuator including: a lower housing having a hollow cylindrical portion protruding upward from the center thereof, the hollow cylindrical portion serving as a support shaft of the rotor; an upper housing stacked and assembled on an upper portion of the lower housing and having a through hole formed in a central portion thereof in which the hollow cylindrical portion protrudes upward through the through hole; a driving motor which is arranged on a bottom surface of the lower housing and has a rotor worm gear integrally formed on an outer circumference of a cylindrical extension unit extending to an upper portion of the rotor; first and second gear trains, each being arranged at intervals of 180 degrees at the outer circumference of the rotor worm gear protruding to the upper housing and being coupled thereto, having, in the middle of first and second power transmission shafts, first and second worm wheels gear-coupled to the rotor worm gear, and having first to fourth worm gears formed at both sides of each of the first and second power transmission shafts; first to fourth pinion gear units in which third to sixth worm wheels gear-coupled to the first to fourth worm gears are formed at the lower ends of first to fourth support shafts, respectively, and first to fourth pinion gears are formed on the upper ends of the first to fourth support shafts, respectively; a rotary table gear-coupled to a ring gear having the first to fourth pinion gears integrally formed on the inner side of the side surface portion thereof, so as to rotate. The third to sixth worm wheels and the first to fourth pinion gears of the first to fourth pinion gear units are individually sintered and formed and then the polygonal coupling parts of the third to sixth worm wheels are coupled to the polygonal inner circumferences of the first to fourth pinion gears, respectively.

The cylindrical extension portion extending to the upper portion of the rotor and the cylindrical first worm gear may be vertically set on the bottom surface of the lower housing, and the first and second power transmission shafts may be installed in a horizontal direction orthogonal to the axis of the cylindrical rotor worm gear, and the first to fourth support shafts may be installed in a vertical direction orthogonal to the first and second power transmission shafts, respectively.

The upper housing may include first and second concave grooves accommodating the first and second gear trains and the first to fourth pinion gear units.

In this case, when the rotor and the first worm gear of the driving motor rotate clockwise, the first and second power transmission shafts may rotate counterclockwise, and the rotary table may rotate clockwise.

In addition, both end portions of each of the first and second power transmission shafts are rotatably supported by bearings, and a plurality of set screws may be installed in the bearing housing in which the bearings are embedded to suppress the occurrence of left and right displacements of the first and second power transmission shafts.

The first and second gear trains may include: first and second power transmission shafts arranged to face each other at intervals of 180 degrees on the outer circumference of the rotor worm gear; first and second worm wheels that are gear-coupled to the rotor worm gear in the middle portions of the first and second power transmission shafts; and first to fourth worm gears formed on one side and the other side of each of the first and second power transmission shafts.

In addition, each of the first and second power transmission shafts may further include: a pair of bearings installed in first and second concave grooves of the upper housing respectively to rotatably support both end portions; a pair of bearing housings that accommodate and support the pair of bearings; a pair of set screw assembly units formed to extend from the rear end portions of the pair of bearing housings; and a pair of set screws which are screw-coupled to the set screw assembly units so that front end portions thereof support end portions of the power transmission shafts. The set screws may suppress axial displacement of the first and second power transmission shafts by pushing and fixing the first and second power transmission shafts to one side from the outside through set screw adjustment through holes formed in the upper housing.

In addition, the driving motor may further include: a rotor provided with a rotor support which is rotatably coupled to the outer circumference of the cylindrical portion and has a lower end portion which is formed in a cup shape; and a stator arranged on the bottom of the lower housing outside the rotor, to rotate and drive the rotor, wherein the swivel actuator may further include: a lower bearing arranged between the cup-shaped lower end portion of the rotor support and a lower end portion of the hollow cylindrical portion of the housing to rotatably support the rotor; and an upper bearing rotatably supporting the rotary table on an outer circumference of the hollow cylindrical portion.

In addition, the swivel actuator according to the present invention may further include a ring-shaped stopper inserted between the lower bearing and the upper bearing installed on the outer circumference of the hollow cylindrical portion to set the relative positions of the lower bearing and the upper bearing.

The stator coil of the driving motor and the cable for connecting the plurality of Hall sensors in the Hall sensor assembly with the motor driving circuit installed outside the swivel actuator may be connected through a central through hole in the center of the top plate and a hollow cylindrical portion of the lower housing.

In addition, the rotary table includes: a top plate on which a car seat is installed, and which is equipped with a through hole in the center where the upper end portion of the hollow cylindrical portion of the lower housing is located; a side surface portion extending downward from an outer circumferential portion of the upper plate; and a ring gear integrally formed inside the side surface portion, wherein the first to fourth pinion gears of the first to fourth pinion gear units may be gear-coupled to the ring gear of the rotary table at four points.

Advantageous Effects

As described above, in the present invention, a worm wheel and a worm gear are integrally formed at intervals on a power transmission shaft to provide a power transmission structure capable of minimizing backlash by a gear train change structure in which the number of coupling gears is minimized. As a result, the present invention may reduce overall size and secure a space compared to a conventional gear train in which a plurality of spur gears are combined, thereby increasing degree of freedom in design and reducing costs.

In addition, according to the present invention, a BLDC driving motor is installed on the bottom of a housing, and first and second gear trains, in which a worm wheel and a worm gear are integrally formed at intervals on a power transmission shaft, are arranged in a symmetrical structure in the housing, thereby minimizing backlash and simultaneously suppressing vibration generation of the rotary table.

Moreover, in this invention, the BLDC driving motor is installed on the bottom of the housing, the worm wheels of the first and second gear trains are arranged in a symmetrical structure on the outer circumference of the cylindrical rotor worm gear of the driving motor, and four pinion gear units are combined with the four worm gears formed at both end portions of the first and second gear trains to be combined with the ring gear of the rotary table at four points, thereby minimizing backlash and suppressing the vibration generation of the rotary table.

In addition, the swivel actuator according to the present invention may employ a double worm structure at both end portions of each of a first gear train and a second gear train, thereby coupling four pinion gear units to four worm gears and thus driving a rotary table, to accordingly increase the fracture strength by increasing the brake torque while minimizing the backlash.

As described above, when the first and second gear trains are arranged in a symmetrical structure inside the housing, it is possible to reduce a tolerance between gears, but it is difficult to completely reduce the tolerance. In other words, the gap between the gears is minimized, but the tolerance between the gears occurs, resulting in a gap between the gears, which may cause a driven body (e.g., the rotary table) gear-coupled with the pinion gear unit to shake left and right.

This problem may be caused by the occurrence of the left and right (i.e., axial) displacement of both end portions of the power transmission shafts forming the gear train in the bearing housing. Accordingly, in the present invention, a set screw screw-coupled to a set screw assembly unit formed to extend to the rear end portion of the bearing housing is added to suppress occurrence of left and right displacement of both end portions of the power transmission shafts in the bearing housing, and axial displacement of the first and second power transmission shafts may be suppressed by pushing and fixing the first and second power transmission shafts to one side by tightening the set screw from the outside through set screw adjustment through holes formed in the housing.

As a result, by suppressing the left and right displacement of the first and second power transmission shafts, the tolerance (gap) that occurs when the gears are coupled between the worm gear of the gear train and the worm wheel of the pinion gear unit is eliminated, and as a result, the gap between the pinion gear of the pinion gear unit and the ring gear of the driven body (e.g., the rotary table) may be removed to zero the backlash.

In general, a pinion gear and a worm wheel forming a pinion gear unit are integrally formed by injection molding, and then assembled to a support shaft. In the present disclosure, after the pinion gear and the worm wheel are sintered and formed, the polygonal coupling portion of the worm wheel is inserted into the polygonal inner circumferential portion of the pinion gear to form the pinion gear unit, thereby maximizing the torsional force of the pinion gear and the worm wheel connected to the ring gear.

In addition, as the lower end portion of the support shaft has a two-stage structure in which a stopper flange is formed, when the pinion gear and the worm wheel forming the pinion gear unit are rotated, the main force is received in the radial direction, but when a force is applied in the axial direction, the support shaft may be prevented from being separated.

BRIEF DESCRIPTION OF THE DRAWINGS

FIGS. 1 to 3 are a perspective view, a plan view, and a cross-sectional view taken along line A-A of FIG. 2, respectively, of a hollow swivel actuator according to a preferred embodiment of the present invention.

FIGS. 4 and 5 are an exploded perspective view illustrating that a rotary table is separated from a hollow swivel actuator according to a preferred embodiment of the present invention, and a plan view of FIG. 4 in which the rotary table has been removed, respectively.

FIGS. 6A to 6C are cross-sectional views taken along line B-B, line C-C, and line D-D of FIG. 5, respectively.

FIGS. 7 and 8 are a module—each exploded perspective view and a fully exploded perspective view of a hollow swivel actuator according to a preferred embodiment of the present invention, respectively.

FIG. 9 is an exploded perspective view illustrating an upper portion of a rotary table has been removed from a hollow swivel actuator according to a preferred embodiment of the present invention.

FIG. 10A is a plan view of a pinion gear unit according to a preferred embodiment of the present invention, FIG. 10B is a cross-sectional view taken along line E-E of FIG. 10A, FIG. 10C shows a top view and a cross-sectional view of the pinion gear, and FIG. 10D shows a top view and a cross-sectional view of the worm wheel.

BEST MODE FOR CARRYING OUT THE INVENTION

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A swivel actuator according to the present invention is used for rotating a passive object main body, that is, a car seat for a vehicle to the left and right together with a rotational table. In the following description, a hollow swivel actuator for driving a passive object by using a BLDC-type driving motor as a power source is described.

It is difficult to apply a BLDC motor to a general motor, but in this invention, the BLDC motor is vertically erected and the size of the BLDC motor in a radial direction is increased to increase motor torque. The driving motor has a stator and a rotor arranged on the bottom surface of the housing, and uses an inner rotor type BLDC motor.

An actuator according to the conventional art includes a motor portion made of a DC motor, a gear part, and a rotating part, which are configured as separate components, so when assembling the actuator to a main body using an actuator product, there are many problems such as assembly tolerance and supply of parts.

A swivel actuator according to the present invention includes a driving motor, a gear train, and a rotating body, which are integrally formed, to thereby achieve miniaturization and slimness while solving the problems of conventional technology.

In addition, a hollow swivel actuator according to the present invention is formed in a disc shape, and includes a through hole for withdrawing a cable, which is formed in a central portion thereof as an inner hollow shape, and a plurality of coupling holes, for example, four coupling holes, which are formed on an upper portion of a rotating body (a rotary table) so as to be connected to a passive object, in which a lower end portion of a fixing bolt passes through each of the coupling holes so as to be screw-coupled to and fixed to a stud nut fixedly installed on an inner surface of the rotary table.

Moreover, the hollow swivel actuator according to this invention may minimize backlash and suppress vibration generation by installing a BLDC-type driving motor on the bottom of a housing and placing, in a symmetrical structure inside the housing, first and second gear trains in which a worm wheel and worm gear are integrally formed at intervals on a power transmission shaft.

The swivel actuator has an annular stator arranged on the bottom of the housing and a rotor arranged therein and having a rotor worm gear integrally formed on the upper side thereof. The first and second gear trains are coupled to the outer circumference of the rotor worm gear in a symmetrical structure. The worm wheel of the power transmission shaft forming each of the first and second gear trains is gear-coupled to the outer circumference of the rotor worm gear. The four worm gears formed at both ends of the power transmission shaft are coupled to the worm wheels located at the bottom of each of the four pinion gear units. The four pinion gears located at the top of the four pinion gear units are coupled at four points to the ring gear formed inside the side surface portion of the rotary table, to rotatably drive the rotary table.

As a result, the swivel actuator according to the present invention increases the torque by decelerating the rotational output of the driving motor, couples the first and second gear trains to the rotor worm gear of the driving motor in a symmetrical structure, when transmitting the decelerated output to the rotary table, forms a double worm structure at both end portions of the first and second gear trains, and transfers the rotational force to the ring gear of the rotary table through four pinion gear units in the double worm, to thereby minimize backlash, suppress generation of vibration of the rotary table, and increase destructive strength by increasing brake torque.

The swivel actuator according to the present invention includes a BLDC-based driving motor, a pair of gear trains which increases the torque by deceleration of the rotational power of the driving motor and then transmits the increased torque to the rotary table, four pinion gear units coupled to both end portions of each of the pair of gear trains, and a rotary table coupled at four points by a rotational output of the four pinion gear units to rotate together with the ring gear, wherein a passive body such as a vehicle seat is coupled to the rotary table to rotate together with the rotary table.

In this case, the driving motor, the gear trains, the pinion gear units, and the rotary table are integrally assembled to the housing.

Referring to FIGS. 1 to 10D, a hollow swivel actuator 200 according to a preferred embodiment of the present invention includes: a lower housing 10 having a hollow cylindrical portion 11_a_ protruding upward at a center thereof; an upper housing 15 stacked and assembled on an upper portion of the lower housing 10 and having a through hole 15_c_ formed in a central portion thereof in which the hollow cylindrical portion 11_a_ protrudes upward through the through hole 15_c_; a driving motor 100 which is arranged on a bottom surface of the lower housing 10 and has a first worm gear 35 integrally formed on an outer circumference of an extension unit of a rotor support 34 extending to an upper portion of the rotor 30; first and second gear trains 70_a_ and 70_b_ which are arranged in the upper housing 15, and coupled to the outer circumference of the rotor worm gear 35 in which first and second worm wheels 72_a_ and 72_b_ gear-coupled to the rotor worm gear 35 are respectively formed at the middle portions of first and second power transmission shafts 71_a_ and 71_b_, and first to fourth worm gears 73_a_ to 73_d_ are respectively formed at one-side portion and the other-side portion of the first and second power transmission shafts 71_a_ and 71_b_; first to fourth pinion gear units 80_a_ to 80_d_ in which third to sixth worm wheels 81_a_ to 81_d_ gear-coupled to the first to fourth worm gears 73_a_ to 73_d_ are formed at the lower ends of first to fourth pinion gear units 80_a_ to 80_d_, respectively, and first to fourth pinion gears 82_a_ to 82_d_ are formed on the upper ends of the first to fourth pinion gear units 80_a_ to 80_d_, respectively; and a rotary table 20 configured to rotate in which the first to fourth pinion gears 82_a_ to 82_d_ of the first to fourth pinion gear units 80_a_ to 80_d_ are gear-coupled to a ring gear 24 integrally formed on the inner side of a side surface portion of the rotary table 20.

The driving motor 100 is installed in the lower housing 10, and a hollow cylindrical portion 11_a_ serving as a support shaft of the rotor 30 protrudes in the center thereof.

In addition, the upper housing 15 is stacked and assembled on the upper portion of the lower housing 10, and a plurality of fixing bolts or screws 17 are fastened and fixed between the upper housing 15 and the lower housing 10. The first and second gear trains 70_a_ and 70_b_ and the first to fourth pinion gear units 80_a_ to 80_d_ are accommodated in the upper housing 15, and a rotary table 20 is rotatably installed above the upper housing 15.

The driving motor 100 generates rotational power, and the first and second gear trains 70_a_ and 70_b_ receive the rotational power and perform torque conversion by decelerating the speed to generate reduced rotational power with increased torque.

Additionally, the first to fourth pinion gear units 82_a_ to 82_d_ are installed vertically on the first to fourth worm gears 73_a_ to 73_d_ of the first and second gear trains 70_a_ and 70_b_, respectively, to receive reduced rotational power with increased torque, and then transmit the same to the ring gear 24 integrated with the rotational table 20.

The driving motor 100 may be configured as an inner rotor type in which a rotor 30 is arranged inside a stator 40, and includes the rotor 30 rotatably coupled to the outer circumference of the hollow cylindrical portion 11_a_ of the lower housing 10, and the stator 40 arranged at an outer side of the rotor 30 with an air gap therebetween and arranged on a bottom surface of the lower housing 10 to rotate the rotor 30 by generating a rotating magnetic field, wherein the rotor worm gear 35 is integrally formed on the outer peripheral portion of the extension portion of the rotor support 34 extending to the upper portion of the rotor 30, and is rotatably coupled to the outer circumference of the hollow cylindrical portion 11_a_.

In the rotor 30, a magnet 31 arranged on the outer circumference of a back yoke 32 located inside the rotor 30, may include a magnet which includes split magnet pieces of a plurality of N-poles and S-poles or a magnet in which N-poles and S-poles are split-magnetized in multiple poles in a ring-shaped magnet. The back yoke 32 is installed on a rear surface of the magnet 31 to form a magnetic circuit.

The rotor 30 includes the rotor support 34, and a lower end portion of the rotor support 34 is formed in a cup shape to rotatably support the rotor 30 on an outer circumference of the hollow cylindrical portion 11_a_ serving as a support shaft, and accommodates first and second bearings 61 and 62 therein, and accommodates the back yoke 32 and the magnet 31 outside the lower end portion thereof.

In this case, the rotor support 34 serves as a bearing housing in which the inner concave groove 34*a* provided inside the lower end portion thereof accommodates the first and second bearings 61 and 62, and the outer concave groove 34*b* formed outside the rotor support 34 serves as a support for accommodating the back yoke 32 and the magnet 31.

In addition, the rotor support 34 extends upward through a through hole 15*c* of the upper housing 15, and a rotary worm gear 35 is integrally formed on an outer circumferential portion of the cylindrical extension portion.

The first and second bearings 61 and 62 are stacked up and down in series between the rotor support 34 and the hollow cylindrical portion 11*a* and stably support the rotor 30. As a result, the first and second bearings 61 and 62 stacked in series may promote verticality and dimensional stability when the rotor 30 rotates.

The stator 40 includes: a stator core 45 having a plurality of teeth 41 each having a "T" shape and a back yoke 42 interconnected with the plurality of teeth 41 to form a magnetic circuit; upper and lower insulators 44*a* and 44*b* made of insulating material, which are integrally formed to surround the outer circumferential surface on which coils 43 of each of the plurality of teeth are wound; and the coil 43 wound around the outer circumferential surfaces of the insulators 44*a* and 44*b*.

In this case, the insulator 44*a* and 44*b* may be integrally formed as a bobbin and a stator support surrounding the back yoke 42 along with the plurality of teeth 41.

The swivel actuator 200 according to this invention may include the BLDC motor with a 20 pole-18 slot structure, for example, as the driving motor 100. In addition, when the coil 43 of the stator 40 is wound on the plurality of teeth 41, the driving motor 100 may be configured to wind the coil 43 in a U, V, and W three-phase structure, and the other ends of the U, V, and W three-phase coils 43 may be connected in a star-connection method. Moreover, the driving motor 100 may be driven by a 6-step full-wave driving method using an inverter after receiving a rotor position signal from two or three Hall sensors, for example, in a motor driving circuit.

The first and second gear trains 70*a* and 70*b* are respectively arranged in the first and second concave grooves 15*a* and 15*b* formed to face each other with respect to the hollow cylindrical portion 11*a* protruding upward through a through hole 15*c* positioned at the center of the upper housing 15 stacked and assembled on the upper portion of the lower housing 10.

The first and second gear trains 70*a* and 70*b* include first and second power transmission shafts 71*a* and 71*b* arranged to face each other at intervals of 180 degrees on the outer circumference of the rotor worm gear 35, first and second worm wheels 72*a* and 72*b* that are gear-coupled to the rotor worm gear 35 in the middle of the first and second power transmission shafts 71*a* and 71*b*, and first to fourth worm gears 73*a* to 73*d* formed on one-side portions and the other-side portions of the first and second power transmission shafts 71*a* and 71*b*, respectively.

Both end portions of each of the first and second power transmission shafts 71*a* and 71*b* are rotatably supported by a pair of bearings 74*a* and 74*b* and a pair of bearings 75*a* and 75*b*, respectively, and the first and second concave grooves 15*a* and 15*b* have a concave groove shape that accommodates the first and second gear trains 70*a* and 70*b* and the first to fourth pinion gear units 80*a* to 80*d*.

In this case, in the present invention, set screws 76*a* to 76*d* are added to the rear end portions of the bearing housings, respectively, to prevent the first and second power transmission shafts 71*a* and 71*b* from causing left and right displacements in the bearing housings supporting two pairs of bearings 74*a*, 74*b*, 75*a* and 75*b* to limit the left and right movements of the first and second power transmission shafts 71*a* and 71*b*.

Each of the set screws 77*a* to 77*f* may have a male thread formed on the outer circumference of the body, a "−" or "+" groove may be formed at the rear end portion to accommodate the front end of the driver, and the front end thereof may be curved or flat.

Each of the set screws 76*a* to 76*d* is screw-coupled to a female thread formed in a through hole penetrating inward from the rear end portion of each of the bearing housings, and the front end portions of the six set screws 76*a* to 76*d* are coupled in a manner of pushing and compressing both end portions of each of the first and second power transmission shafts 71*a* and 71*b*.

The set screws 76*a* to 76*d* may be preferably installed in all four bearing housings of the four bearings 74*a*, 74*b*, 75*a*, and 75*b* that rotatably support both end portions of the first and second power transmission shafts 71*a* and 71*b*, or the set screws 76*a* to 76*d* may be installed only in one-side portions of the bearing housings to support one-end portions of the first and second power transmission shafts 71*a* and 71*b* to push the first and second power transmission shafts 71*a* and 71*b* in one direction to suppress the left and right movements thereof.

The set screws 76*a* to 76*d* may have front end portions protruding in a spherical shape to minimize contact with the end portions of the first and second power transmission shafts 71*a* and 71*b*. Alternatively, it is also possible to use the set screws 76*a* to 76*d* having front end portions in a surface shape. In this invention, since the round per minute (rpm) of the driving motor 100 is few and the gear ratio thereof is large, the shapes of the front end portions of the set screws 76*a* to 76*d* are not significantly influential.

The first to four pinion gear units 80*a* to 80*d* are installed in the first to fourth support shafts 83*a* to 83*d* having lower ends installed through the bottom of the upper housing 15, the third to sixth worm wheels 81*a* to 81*d* gear-coupled to the first to fourth worm gears 73*a* to 73*d* are formed in lower end portions of the first to fourth support shafts 83*a* to 83*d*, respectively, and the first to fourth pinion gears 82*a* to 82*d* are formed in upper ends of the first to fourth support shafts 83*a* to 83*d*, respectively.

The first to fourth pinion gear units 80*a* to 80*d* may rotatably support the first to fourth pinion gears 82*a* to 82*d* and the third to sixth worm wheels 81*a* to 81*d* integrally formed by injection molding using a synthetic resin on the first to fourth support shafts 83*a* to 83*d*.

In the present invention, a torsional force of the first to fourth pinion gears 82*a* to 82*d* and the third to sixth worm wheels 81*a* to 81*d* which are connected to the ring gear 25 may be maximized by sintering and forming the first to fourth pinion gears 82*a* to 82*d* and the third to sixth worm wheels 81*a* to 81*d* and then assembling the first to fourth pinion gears 82*a* to 82*d* with the third to sixth worm wheels 81*a* to 81*d*, respectively.

As illustrated in FIGS. 10A to 10D, each of the pinion gear 82 and the worm wheel 81 may be sintered and formed, and then a polygonal outer circumferential portion of the worm wheel 81 may be inserted into a polygonal inner circumferential portion of the pinion gear 82 to form the pinion gear unit 80.

As shown in FIG. 10C, the pinion gear 82 has a plurality of gears 824 extending in a radial direction from an annular body 822, and a polygonal inner circumferential portion 820 having a hexagonal or octagonal shape is formed in the central portion of the pinion gear 82.

In addition, as shown in FIG. 10D, the worm wheel 81 has a plurality of gears 814 extending in the radial direction from an annular body 818. A through hole 812 to which a support shaft is coupled is formed at a central portion of the annular body 818. An outer circumferential portion of the coupling portion 810 extending upward from the annular body 818 is formed in a polygonal shape having a hexagonal shape or an octagonal shape so as to be coupled to the polygonal inner circumferential portion 820 of the pinion gear 82.

When the worm wheel 81 is rotated at the lower end portion of the annular body 818, a stepped portion 816 may be formed to protrude so as to minimize contact resistance with the bottom of the upper housing 15.

As described above, after the support shaft is assembled through the bottom of the upper housing 15, the worm wheel 81 and the pinion gear 82 sintered and formed on the upper portion of the support shaft are sequentially assembled, and a stopper such as a snap ring or a stopper ring is coupled to the annular concave groove formed in the upper end portion thereof to prevent separation of the worm wheel 82 and the pinion gear 82. In this case, since the polygonal outer peripheral portions of the third to sixth worm wheels 81*a* to 81*d* are coupled to the polygonal inner circumferential portions of the first to fourth pinion gears 82*a* to 82*d* connected to the ring gear 25, the torsional force may be maximally implemented, and thus the rotational force of the driving motor 100 may be effectively transmitted to the rotary table 20.

Each of the first to fourth support shafts 83*a* to 83*d* has a two-stage structure in which a stopper flange 84 is formed at a lower end portion thereof, and is installed to pass through the bottom of the upper housing 15.

In this case, it is preferable that a locking recess of the stopper flange 84 is formed in the through hole. In this case, when the first to fourth pinion gears 82*a* to 82*d* and the third to sixth worm wheels 81*a* to 81*d* forming the first to fourth pinion gear units 80*a* to 80*d* are rotated, the main force is received in the radial direction, but when a force is applied in the axial direction, the first to fourth support shafts 83*a* to 83*d* may be prevented from being separated.

The rotary table 20 has the circular upper plate 21 and the side surface portion 23 extending downward from the outer circumference of the upper plate 21. The upper plate 21 has a plurality of coupling holes which are penetratively formed for coupling with a main body, which is a passive body (e.g., electric seat) installed in the rotary table 20.

A central through hole 25 through which a cable for connecting to a motor driving circuit installed outside the swivel actuator 200 passes from a stator coil 43 of the driving motor 100 and a plurality of Hall sensors provided in the Hall sensor assembly 50 is formed at the center of the upper plate 21.

Accordingly, the cable is introduced downward through the central through hole 25 provided in the center of the upper plate and the hollow cylindrical portion 11*a* of the lower housing 10, and then connected to a stator coil 43 and a Hall sensor assembly 50 through a through hole 19*a* formed at the bottom of the lower housing 10. The through hole 19*a* is finished by being assembled with a through hole cover 19.

In this case, the motor driving circuit may be embedded in a space formed under the housing.

Moreover, the upper end portion of the hollow cylindrical portion 11*a* of the lower housing 10 is located in the central through hole 25, and a third bearing 63 may be installed in the center of the inner circumferential surface of the upper plate 21 to rotatably support the rotary table 20 to the outer circumference of the hollow cylindrical portion 11*a*.

In this case, the outer wheel of the third bearing 63 is supported by the bearing housing 26 protruding from the lower portion of the rotational table 20, and the inner wheel of the third bearing 63 is supported by the hollow cylindrical portion 11*a* of the lower housing 10 while the lower end portion thereof is located at the upper end of the bearing support 64.

Furthermore, the hollow swivel actuator 200 has a stopper insertion concave groove 11*c* formed at the upper end portion of the hollow cylindrical portion 11*a*, and a stopper 13 is coupled to the stopper insertion concave groove 11*c* to prevent the rotary table 20 from being separated.

Moreover, a ring-shaped bearing support 64 is inserted between the third bearing 63 and the second bearing 62 installed on the outer circumference of the hollow cylindrical portion 11*a*, to set the positions of the third bearing 63 and the second bearing 62.

A ring gear 24 is integrally formed inside the side surface portion 23 of the rotary table 20, and first to fourth pinion gears 82*a* to 82*d* of the first to fourth pinion gear units 80*a* to 80*d* are gear-coupled to the ring gear 24.

In addition, a ring-shaped oil seal 13 is inserted between the central through hole 25 of the rotary table 20 and the hollow cylindrical portion 11*a* to prevent the leakage of oil and foreign substances such as dust from penetrating into the inside.

As described above, the present invention provides a power transmission structure capable of minimizing backlash due to a gear train change structure that minimizes the number of coupled gears, by arranging the first and second worm wheels 72*a* and 72*b* in each of the first and second power transmission shafts 71*a* and 71*b*, and forming the first to fourth worm gears 73*a* to 73*d* in an integral form at both end portions thereof at intervals in each of the first and second power transmission shafts 71*a* and 71*b*.

As a result, the present invention may reduce overall size and secure a space compared to a conventional gear train in which a plurality of spur gears are combined, thereby increasing degree of freedom in design and reducing costs.

In addition, in the present invention, the BLDC driving motor 100 is installed on the bottom of the lower housing 10, and the first and second gear trains 70*a* and 70*b* are arranged inside the upper housing 15 assembled above the lower housing 10 to face each other at an interval of 180 degrees, to minimize backlash and suppress vibration generation. Here, the first and second gear trains 70*a* and 70*b* are configured so that the first and second worm wheels 72*a* and 72*b* and the first to fourth worm gears 73*a* to 73*d* are integrally formed at intervals with the first and second power transmission shafts 71*a* and 71*b*.

In this invention, as described above, the first to fourth worm gears 73*a* to 73*d* are integrally formed to have a double worm structure at both end portions of each of the first and second power transmission shafts 71*a* and 71*b* while evenly arranging and combining the two first and second gear trains 70*a* and 70*b* at 180 degrees intervals to the rotor worm gear 35 of the driving motor 100, and the first to fourth worm gears 73*a* to 73*d* are gear-coupled at four points in the ring gear 24 using the four third to sixth worm wheels 81*a* to 81*d* of the first to fourth pinion gear units 80*a* to 80*d* and the first to fourth pinion gears 82*a* to 82*d* thereof.

As a result, in the present invention, as a double worm structure is adopted at either end portion of each of the first and second gear trains 70*a* and 70*b*, the four pinion gear units 80*a* to 80*d* are combined with the four worm gears 73*a* to 73*d* to drive the rotary table 20, thereby increasing the fracture strength while increasing the brake torque while minimizing the backlash.

As described above, when the first and second gear trains 70*a* and 70*b* are arranged inside the upper housing 15, it is possible to reduce a tolerance between gears, but it is difficult to completely reduce the tolerance. That is, a gap between the gears is minimized but a tolerance between gears is generated to form a gap, and thus the rotary table 20 gear-coupled to the first to fourth pinion gears 82*a* to 82*d* and the passive object to be driven thereon may be shaken in the left and right directions.

This problem may be caused by the occurrence of the left and right displacement of both end portions of the power transmission shafts forming the gear train in the bearing housing. In this invention, both ends of each of the first and second power transmission shafts 71*a* and 71*b* are rotatably supported by four bearings 74*a*, 74*b*, 75*a* and 75*b*, respectively.

The four bearings 74*a*, 74*b*, 75*a*, and 75*b* are embedded in the four bearing housings fixedly installed in the first and second concave grooves 16*a* and 16*b* formed on the bottom of the upper housing 15. In this invention, four set screws 76*a* to 76*d* are added to the rear end portions of the bearing housings so that both end portions of each of the first and second power transmission shafts 71*a* and 71*b* suppress the occurrence of left and right displacements in the bearing housings.

As a result, the left and right displacements of the first and second power transmission shafts 71*a* and 71*b* are suppressed to eliminate a tolerance (gap) generated when the first to fourth worm gears 73*a* and 73*d* of the first and second gear trains 70*a* and 70*b* and the third to sixth worm wheels 81*a* to 81*d* of the first to fourth pinion gear units 80*a* to 80*d* are gear-coupled with each other. In addition, the gap between the first to fourth pinion gears 82*a* to 82*d* of the first to fourth pinion gear units 80*a* to 80*d* and the ring gear 24 of the rotary table 20 may be removed to zero the backlash.

The compression between the set screws 76*a* to 76*d* and the first and second power transmission shafts 71*a* and 71*b* may suppress the left and right movements of the first and second power transmission shafts 71*a* and 71*b* by assembling the first and second power transmission shafts 71*a* and 71*b* inside the upper housing 15, and then pushing the first and second power transmission shafts 71*a* and 71*b* by advancing the set screws 76*a* to 76*d* in one direction.

Hereinafter, an operation of the inner hollow swivel actuator 200 according to the present invention will be described with reference to FIGS. 1 to 10D.

When the BLDC driving motor 100 installed on the bottom of the lower housing 10 is operated in the hollow swivel actuator 200 of this invention, the rotor 30 rotates and the rotor worm gear 35 formed integrally on the upper side of the rotor support 34 of the rotor 30 rotates in the same direction.

When the rotor worm gear 35 rotates, the first and second worm wheels 72*a* and 72*b* of the first and second gear trains 70*a* and 70*b*, which are arranged at intervals of 180 degrees on the outer circumference of the rotor worm gear 35, rotate, and the first and second power transmission shafts 71*a* and 71*b* also rotate.

As a result, the first to fourth worm gears 73*a* to 73*d* formed on the other-side portions of the first and second power transmission shafts 71*a* and 71*b* rotate the third to sixth worm wheels 81*a* to 81*d* of the first to fourth pinion gear units 80*a* to 80*d* to be gear-coupled to the first to fourth worm gears 73*a* to 73*d*.

Accordingly, the first to fourth pinion gears 82*a* to 82*d* located at the upper end portions of the first to fourth pinion gear units 80*a* to 80*d* are rotated and driven, and the first to fourth pinion gears 82*a* to 82*d* are gear-coupled to the ring gear 24 provided on the rotary table 20 at intervals of 90 degrees to rotate the ring gear 24 in the same direction.

In the present invention, when the BLDC driving motor 100 is rotated at about 800 rpm, the BLDC driving motor 50 is decelerated to approximately 400:1 through the first and second gear trains 70*a* and 70*b*, and the rotary table 20 is reduced in rotating speed at a low speed of about 2 rpm, resulting in an increase in a large torque.

As described above, as the present invention adopts a double worm structure at either end portion of each of the first and second gear trains 70*a* and 70*b* while arranging the first and second gear trains 70*a* and 70*b* in a symmetrical structure inside the upper housing 15, four pinion gear units 80*a* to 80*d* are coupled to the four worm gears 73*a* to 73*d* to drive the rotary table 20, thereby increasing the fracture strength by increasing the break torque while minimizing the backlash.

In addition, in the present invention, the set screws 77*a* to 76*d* are added to the set screw assembly units extending from the rear end portions of the bearing housings so that both end portions of each of the first and second power transmission shafts 71*a* and 71*b* suppress left and right displacement from occurring in the bearing housings 78*a* to 78*d*.

In the present invention, after assembling all the components of the swivel actuator 200 inside the upper housing 15, one for each of the first and second power transmission shafts 71*a* and 71*b*, that is, two of the four set screws 76*a* to 76*d* installed in a set screw assembly unit are advanced in one direction, from the outside through a set screw adjustment through hole (not shown) formed in the wall of the upper housing 15, thereby suppressing the left and right movement of the first and second power transmission shafts 71*a* and 71*b* by pushing and fixing the first and second power transmission shafts 71*a* and 71*b* to one side.

As a result, the left and right displacements of the first and second power transmission shafts 71*a* and 71*b* are suppressed by tightening the set screws 76*a* to 76*d*, to thereby eradicate a tolerance (gap) which may be generated during gear-coupling between the first to fourth worm gears 73*a* to 73*d* of the first and second gear trains 70*a* and 70*b* and the third and sixth worm wheels 81*a* to 81*d* of the first to fourth pinion gear units 80*a* to 80*d*. In addition, the gap between the first to fourth pinion gears 82*a* to 82*d* of the first to fourth pinion gear units 80*a* to 80*d* and the ring gear 24 of the rotary table 20 may be removed to zero the backlash.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

Industrial Applicability

The swivel actuator according to the present invention may be applied for rotating a passive object such as a car seat installed on a rotary table so as to rotate left and right together with the rotary table.

What is claimed is:

1. A swivel actuator comprising:

a lower housing having a hollow cylindrical portion protruding upward from a center of the lower housing, the hollow cylindrical portion serving as a support shaft of a rotor;

an upper housing stacked and assembled on an upper portion of the lower housing and having a through hole formed in a central portion of the upper housing in which the hollow cylindrical portion protrudes upward through the through hole;

a driving motor which is arranged on a bottom surface of the lower housing and has a rotor worm gear integrally formed on an outer circumference of a cylindrical extension unit extending to an upper portion of the rotor;

first and second gear trains, each being arranged at intervals of 180 degrees at an outer circumference of the rotor worm gear protruding to the upper housing and being coupled to the upper housing, having, in a middle of first and second power transmission shafts, first and second worm wheels gear-coupled to the rotor worm gear, and having a first worm gear, a second worm gear, a third worm gear and a fourth worm gear formed at both sides of each of the first and second power transmission shafts;

a first pinion gear unit, a second pinion gear unit, a third pinion gear unit and a fourth pinion gear unit in which a third worm wheel, a fourth worm wheel, a fifth worm wheel and a sixth worm wheel gear-coupled to the first pinion gear unit, the second pinion gear unit, the third pinion gear unit and the fourth pinion gear unit, respectively, are formed at the lower ends of a first support shaft, a second support shaft, a third support shaft and a fourth support shaft, respectively, and a first pinion gear, a second pinion gear, a third pinion gear and a fourth pinion gear are formed on the upper ends of the first support shaft, the second support shaft, the third support shaft and the fourth support shaft, respectively; and a rotary table having a ring gear integrally formed on an inner side of a side surface portion of the rotary table, wherein the first pinion gear, the second pinion gear, the third pinion gear and the fourth pinion gear are gear-coupled to the ring gear so as to rotate, wherein the third worm wheel, the fourth worm wheel, the fifth worm wheel and the sixth worm wheel and the first pinion gear, the second pinion gear, the third pinion gear and the fourth pinion gear of the first pinion gear unit, the second pinion gear unit, the third pinion gear unit and the fourth pinion gear unit are individually sintered and formed and then polygonal coupling parts of the third worm wheel, the fourth worm wheel, the fifth worm wheel and the sixth worm wheel are coupled to polygonal inner circumferences of the first pinion gear, the second pinion gear, the third pinion gear and the fourth pinion gear, respectively.

2. The swivel actuator of claim 1, wherein the rotor of the driving motor is rotatably installed on an outer circumference of the hollow cylindrical portion, and the rotor worm gear is arranged in a vertical direction, the first and second power transmission shafts are arranged in a horizontal direction, and the first support shaft, the second support shaft, the third support shaft and the fourth support shaft are arranged in a vertical direction.

3. The swivel actuator of claim 1, wherein the upper housing comprises first and second concave grooves accommodating the first and second gear trains and the first pinion gear unit, the second pinion gear unit, the third pinion gear unit and the fourth pinion gear unit.

4. The swivel actuator of claim 1, wherein both end portions of each of the first and second power transmission shafts are rotatably supported by bearings, and a plurality of set screws are installed in a bearing housing in which the bearings are embedded to suppress an occurrence of left and right displacements of the first and second power transmission shafts.

5. The swivel actuator of claim 1, wherein the driving motor comprises:

the rotor provided with a rotor support which is rotatably coupled to an outer circumference of the hollow cylindrical portion and has a cup-shaped lower end portion; and a stator arranged on a bottom of the lower housing outside the rotor, to rotate and drive the rotor, wherein the swivel actuator further comprises:

a lower bearing arranged between the cup-shaped lower end portion of the rotor support and a lower end of the hollow cylindrical portion of the housing to rotatably support the rotor; and an upper bearing rotatably supporting the rotary table on an outer circumference of the hollow cylindrical portion.

6. The swivel actuator of claim 1, wherein the first and second gear trains comprise:

the first and second power transmission shafts arranged to face each other at intervals of 180 degrees on the outer circumference of the rotor worm gear;

the first and second worm wheels that are gear-coupled to the rotor worm gear in the middle portions of the first and second power transmission shafts; and the first worm gear, the second worm gear, the third worm gear and the fourth worm gear formed on one side and the other side of each of the first and second power transmission shafts.

7. The swivel actuator of claim 6, wherein each of the first and second power transmission shafts further comprises:

a pair of bearings installed in first and second concave grooves of the upper housing respectively to rotatably support both end portions;

a pair of bearing housings that accommodate and support the pair of bearings;

a pair of set screw assembly units formed to extend from rear end portions of the pair of bearing housings; and a pair of set screws which are screw-coupled to the set screw assembly units so that front end portions of the set screws support end portions of the power transmission shafts, wherein the set screws suppress axial displacement of the first and second power transmission shafts by pushing and fixing the first and second power transmission shafts to one side from the outside through set screw adjustment through holes formed in the upper housing.

8. The swivel actuator of claim 1, wherein a stator coil of the driving motor and a cable for connecting a plurality of Hall sensors in a Hall sensor assembly with a motor driving circuit installed outside the swivel actuator are connected through a central through hole in a center of a top plate and the hollow cylindrical portion of the lower housing.

9. The swivel actuator of claim 1, wherein the rotary table comprises:

a top plate on which a car seat is installed, and which is equipped with a through hole in a center where an upper end portion of the hollow cylindrical portion of the lower housing is located;

a side surface portion extending downward from an outer circumferential portion of the upper plate; and the ring gear integrally formed inside a side surface portion, wherein the first pinion gear, the second pinion gear, the third pinion gear and the fourth pinion gear of the first pinion gear unit, the second pinion gear unit, the third pinion gear unit and the fourth pinion gear unit are gear-coupled to the ring gear of the rotary table at four points.

* * * * *